United States Patent
Mehta et al.

(10) Patent No.: US 9,584,588 B2
(45) Date of Patent: Feb. 28, 2017

(54) MULTI-STAGE FEEDBACK CONTROLLER FOR PRIORITIZING TENANTS FOR MULTI-TENANT APPLICATIONS

(71) Applicants: Arpit Mehta, Kaiserslautern (DE); Rouven Krebs, Ettlingen (DE)

(72) Inventors: Arpit Mehta, Kaiserslautern (DE); Rouven Krebs, Ettlingen (DE)

(73) Assignee: SAP SE, Walldorf (DE)

(*) Notice: Subject to any disclaimer, the term of this patent is extended or adjusted under 35 U.S.C. 154(b) by 325 days.

(21) Appl. No.: 13/972,477

(22) Filed: Aug. 21, 2013

(65) Prior Publication Data

US 2015/0058484 A1 Feb. 26, 2015

(51) Int. Cl.
| | | |
|---|---|---|
| G06F 15/173 | (2006.01) | |
| H04L 29/08 | (2006.01) | |
| G06F 9/50 | (2006.01) | |
| H04L 12/24 | (2006.01) | |

(52) U.S. Cl.
CPC ............ *H04L 67/10* (2013.01); *G06F 9/5072* (2013.01); *H04L 41/5009* (2013.01); *H04L 41/5025* (2013.01); *G06F 2209/5013* (2013.01); *G06F 2209/5021* (2013.01)

(58) Field of Classification Search
CPC ....... H04L 67/10; G05F 9/5083; G05F 9/5038
See application file for complete search history.

(56) References Cited

U.S. PATENT DOCUMENTS

| | | | |
|---|---|---|---|
| 7,756,989 B2 | 7/2010 | Goldszmidt et al. | |
| 7,783,759 B2 | 8/2010 | Eilam et al. | |
| 8,037,187 B2 | 10/2011 | Dawson et al. | |
| 8,347,306 B2 | 1/2013 | Li et al. | |
| 8,380,557 B2 | 2/2013 | Moon et al. | |
| 8,462,632 B1 | 6/2013 | Vincent | |
| 8,468,251 B1 | 6/2013 | Pijewski et al. | |
| 8,539,078 B2 | 9/2013 | Duan et al. | |
| 8,606,924 B2 | 12/2013 | Gujral et al. | |
| 8,706,864 B1 | 4/2014 | Brandwine et al. | |

(Continued)

OTHER PUBLICATIONS

Shue, David, et al. 'Fairness and Isolation in Multi-Tenant Storage as Optimization Decomposition'. ACM SIGOPS Operating Systems Review. vol. 47 Issue 1, Jan. 2013. pp. 16-21.*

(Continued)

*Primary Examiner* — Kevin Bates
*Assistant Examiner* — Dae Kim
(74) *Attorney, Agent, or Firm* — Fish & Richardson P.C.

(57) ABSTRACT

Methods, systems, and computer-readable storage media for determining weights for selecting requests from a plurality of tenant queues in a multi-tenant system receiving measured response time and measured throughput for each tenant in a set of tenants being considered in a current period, for each tenant in the set of tenants, determining a weight based on respective measured response times and respective measured throughput, the weight being determined based on one of a previous weight, an initialized weight, a modified proportional and integral (PI) control, and a volunteer weight increase, providing a set of weights that includes weight for each tenant in the set of tenants, and transmitting the set of weights to an access mechanism, the access mechanism selecting tenant requests for processing by a shared resource.

16 Claims, 4 Drawing Sheets

(56) References Cited

U.S. PATENT DOCUMENTS

| | | |
|---|---|---|
| 8,726,284 B2 | 5/2014 | Liao et al. |
| 8,744,888 B2 | 6/2014 | Li et al. |
| 8,751,573 B2 | 6/2014 | Said et al. |
| 2002/0198995 A1 | 12/2002 | Liu et al. |
| 2003/0223451 A1* | 12/2003 | Bi ........................ H04L 12/5693 370/441 |
| 2004/0133889 A1 | 7/2004 | Colle et al. |
| 2004/0158568 A1 | 8/2004 | Colle et al. |
| 2006/0136276 A1 | 6/2006 | Schmitt |
| 2007/0169036 A1 | 7/2007 | Garner et al. |
| 2010/0077449 A1 | 3/2010 | Kwok et al. |
| 2010/0325281 A1 | 12/2010 | Li et al. |
| 2011/0065492 A1 | 3/2011 | Acres |
| 2011/0086690 A1 | 4/2011 | Acres |
| 2011/0265088 A1* | 10/2011 | Devadhar ............... G06F 9/505 718/102 |
| 2011/0271278 A1 | 11/2011 | Dittrich |
| 2012/0011518 A1 | 1/2012 | Duan et al. |
| 2012/0066020 A1 | 3/2012 | Moon et al. |
| 2012/0151063 A1 | 6/2012 | Yang et al. |
| 2012/0215918 A1 | 8/2012 | Vasters et al. |
| 2012/0227044 A1 | 9/2012 | Arumugham et al. |
| 2012/0291088 A1 | 11/2012 | Srivastava et al. |
| 2013/0003538 A1 | 1/2013 | Greenberg et al. |
| 2013/0074091 A1 | 3/2013 | Xavier et al. |
| 2013/0085998 A1* | 4/2013 | Barker .................. G06F 9/5088 707/649 |
| 2013/0124193 A1 | 5/2013 | Holmberg |
| 2013/0132404 A1 | 5/2013 | Liu et al. |
| 2013/0145006 A1 | 6/2013 | Tammam |
| 2013/0254407 A1* | 9/2013 | Pijewski ............... G06F 9/5083 709/226 |
| 2014/0244879 A1* | 8/2014 | Myrah .................. G06F 13/409 710/300 |
| 2014/0258535 A1 | 9/2014 | Zhang |

OTHER PUBLICATIONS

Krebs, et al., U.S. Appl. No. 13/904,729, "Tenant Selection in Quota Enforcing Request Admission Mechanisms for Shared Applications," May 29, 2013, 25 pages.

U.S. Appl. No. 13/904,729, filed May 29, 2013, Krebs et al.

Chenyang Lu et al., "Feedback Control Architecture and Design Methodology for Service Delay Guarantees in Web Servers," IEEE Transactions on Parallel and Distributed Systems, vol. 17, No. 9, Sep. 2006, pp. 1014-1027.

* cited by examiner

MULTI-STAGE FEEDBACK CONTROLLER FOR PRIORITIZING TENANTS FOR MULTI-TENANT APPLICATIONS

BACKGROUND

Infrastructures such as cloud computing infrastructures are based on sharing resources. The sharing principle can be beneficial on the software as a service (SaaS) level where, for example, a single application instance is shared among multiple groups of users. Such sharing enables significant cost reduction and maintenance efforts. This approach of sharing a single application instance is called multi-tenancy. Multi-tenancy can be described as a principle of delivering SaaS where a group of users, defined as one tenant, share a single application instance with other tenants, and each tenant has its own view onto the application, e.g., in both functional and non-functional aspects.

SUMMARY

Implementations of the present disclosure include computer-implemented methods for determining weights for selecting requests from a plurality of tenant queues in a multi-tenant system. In some implementations, actions include receiving measured response time and measured throughput for each tenant in a set of tenants being considered in a current period, for each tenant in the set of tenants, determining a weight based on respective measured response times and respective measured throughput, the weight being determined based on one of a previous weight, an initialized weight, a modified proportional and integral (PI) control, and a volunteer weight increase, providing a set of weights, the set of weights comprising a weight for each tenant in the set of tenants, and transmitting the set of weights to an access mechanism, the access mechanism selecting tenant requests based on the set of weights for processing by a shared resource.

In some implementations, for each tenant in the set of tenants, determining a weight based on respective measured response times and respective measured throughput includes determining that a response time violation is not present for any tenant in the set of tenants and, in response, determining the weight for each tenant as an initialized weight.

In some implementations, determining that a response time violation is not present is based on respective response time errors, each response time error being determined based on the measured response time and an agreed average response time for a respective tenant.

In some implementations, for each tenant in the set of tenants, determining a weight based on respective measured response times and respective measured throughput includes determining that a response time violation is not present for a particular tenant in the set of tenants and, in response, determining setting the weight for the particular tenant equal to a weight of a previous period.

In some implementations, for each tenant in the set of tenants, determining a weight based on respective measured response times and respective measured throughput includes determining whether a quota violation is present for a particular tenant in the set of tenants.

In some implementations, actions further include determining that the quota violation is present for the particular tenant and, in response, determining the weight for the particular tenant based on the volunteer weight increase.

In some implementations, actions further include determining that the quota violation is not present for the particular tenant and, in response, determining the weight for the particular tenant based on the modified PI control.

In some implementations, determining whether a quota violation is present for the particular tenant in the set of tenants is performed in response to determining that a response time violation is present for the particular tenant.

In some implementations, determining whether a quota violation is present for a particular tenant in the set of tenants is based on a respective quota error, the respective quota error being determined based on the measured throughput and an agreed throughput for the particular tenant.

In some implementations, the measured response time and measured throughput are provided for a previous period.

In some implementations, tenants in the set of tenants include tenants having non-empty request queues.

In some implementations, actions further include normalizing weights in the set of weights, such that a sum of the weights in the plurality of weights is equal to 1.

In some implementations, the volunteer weight increase is determined based on a measured response time and a measured throughput for a respective tenant, and additional time that can be given to disruptive tenants without violating agreements of abiding tenants.

In some implementations, for the current period, a first weight of a first tenant is provided as a previous weight of the first tenant, a second weight of a second tenant is provided as the initialized weight, and a third weight of a third tenant is provided based on a weight determined using the modified PI control.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to for determining weights, or proportion of the total system request processing capacity for selecting requests from a plurality of tenant queues in a multi-tenant system. More particularly, implementations of the present disclosure are directed to dynamically adjusting the weights of each tenant queue per period of a plurality of periods. In some implementations, and as discussed in further detail herein, weights can be determined as initialized weights, as volunteer weights, and/or based on a modified proportional/ integral (PI) control. In some implementations, a weight can be provided based on a weight from a previous period and errors, e.g., relative errors, in one or more metrics, e.g., response time, throughput. In some implementations, initialized weights can be provided at the beginning of a period. In some implementations, weights are revised between periods. In some implementations, errors can be determined based on actual performance and agreed performance, e.g., as defined in an agreement, e.g., service level agreement (SLA). For example, performance can be based on an average measured response time, where, the lower the average response time, the better the performance. In some examples, for each queue polling event during a period, an access mechanism selects requests from the tenant queues based on respective weights.

Figure 1:
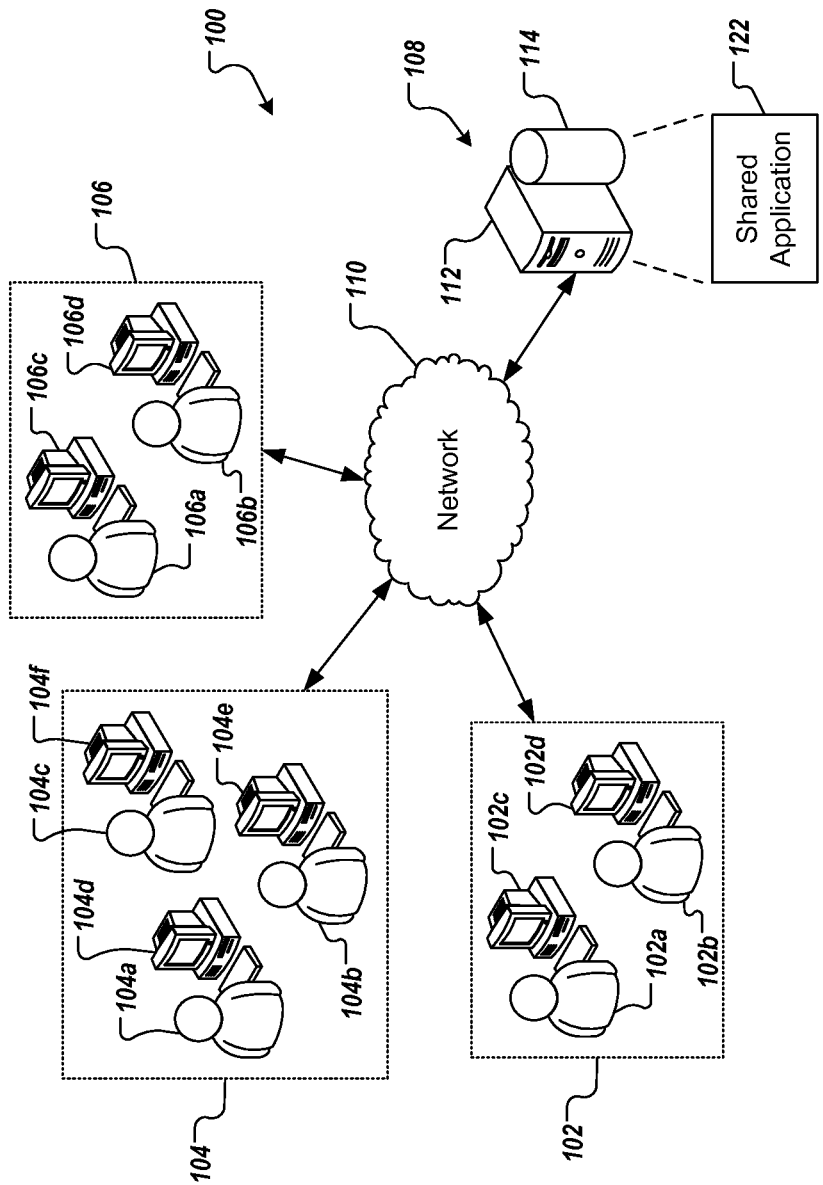
FIG. 1 depicts an example high-level architecture in accordance with implementations of the present disclosure.

FIG. 1 depicts an example architecture 100 in accordance with implementations of the present disclosure. The example architecture 100 is provided as a multi-tenant architecture and includes tenants 102, 104, 106 that communicate with a server system 108 over a network 110. In some examples, each tenant 102, 104, 106 includes multiple users 102a, 102b; 104a, 104b, 104c; 106a, 106b that use respective computing devices 102c, 102d; 104d, 104e, 104f; 106c, 106d to access the server system 108. In some examples, the computing devices 102c, 102d; 104d, 104e, 104f; 106c, 106d can be computing devices such as laptop computers, desktop computers, smartphones, personal digital assistants, portable media players, tablet computers, or other appropriate computing devices that can be used to communicate with the server system 108. In some implementations, the server system 108 can include one or more computing devices such as a computer server 112 and one or more databases 114. In some implementations, the network 110 can be a public communication network (e.g., the Internet, cellular data network, dialup modems over a telephone network) or a private communications network (e.g., private LAN, leased lines).

In accordance with implementations of the present disclosure, the server system 108 can be an application server system that executes a shared application 122. In the context of a multi-tenant architecture, an instance of the shared application 122 is shared by the tenants 102, 104, 106, e.g., the computing devices 102c, 102d; 104d, 104e, 104f; 106c, 106d. Accordingly, an application server instance shared by multiple tenants, where each tenant is provided with a dedicated share of the instance, which is isolated from other shares with regard to performance and data privacy.

As discussed in further detail herein, implementations of the present disclosure provide performance isolation such that the use of the shared application 122 by a tenant does not influence the performance, e.g., quality of service (QoS), experienced by other tenants. More particularly, the respective QoS given to each tenant can be defined based on a SLA between a tenant and the service provider. Implementations of the present disclosure provide differential QoS among different tenants. More particularly, a SLA is a contract between a tenant and a service provider and can define conditions of usage, QoS, and the like. Accordingly, metrics for SLA can be provided. Example metrics can include throughput rate, throughput and average response time. In some examples, the throughput rate, also referred to as quota (denoted as $\lambda_{SLAi}$ for the tenant $T_i$) is the number of requests (also referred to as the throughput; denoted as $X_i$) the tenant $T_i$ is allowed to send per unit of time, e.g., 1 second, in order to have a guaranteed QoS. In some examples, the average response time (denoted as $R_{SLAi}$ for the tenant $T_i$) is the average time taken by the server system, e.g., which can include an access mechanism, to process a tenant request to have the guaranteed QoS. In some examples, actual throughput, throughput rate, and/or response time are determined, e.g., at the server system. In some examples, for each tenant, a guarantee for the average response time is given in the SLA as long as the tenant stays with in its SLA-defined throughput and/or throughput rate.

Implementations of the present disclosure will be discussed in further detail herein with reference to an example context. In the example context, three tenants access a shared application hosted on an application server. It is appreciated, however, that implementations of the present disclosure are applicable in other appropriate contexts, e.g., contexts including fewer tenants, contexts including more tenants. Implementations of the present disclosure will also be discussed in further detail based on the following notations:

S server capacity, e.g., the number of application server threads available for processing tenant requests T $T=\{T_1, \ldots, T_k\}$ is the set of tenants TQ $TQ=\{TQ_1, \ldots, TQ_k\}$ is the set of tenant queues for the respective tenants in T $r_{i,j}$ the $j^{th}$ request from $TQ_i$ of tenant $T_i$ R the total of average SLA response time for all tenants $R_i$ the actual (measured) average response time for tenant $T_i$ $\lambda_i$ the actual (measured) throughput rate provided as the throughput $X_i$ the actual (measured) throughput processed for tenant $T_i$ $Q_i$ the quota throughput, e.g., per a SLA, for tenant $T_i$ W $W=\{W_1, \ldots, W_k\}$ is the set of weights associated with the respective tenant queues for a given period $R_{SLAi}$ the agreed upon (or expected), e.g., per a SLA, average response time for tenant $T_i$ $\lambda_{SLAi}$ the agreed upon (or expected), e.g., per a SLA, throughput rate for tenant $T_i$ $ER_i$ the error in average response time for tenant $T_i$ $EQ_i$ the error in throughput for tenant $T_i$ $E(\lambda_{REL})_i$ the relative error in throughput rate for tenant $T_i$ $W_V$ volunteer weight increase due to free resources In general, and as discussed in further detail herein, requests are selected during a period. In some examples, each period includes multiple iterations, where a request is selected per iteration. In some implementations, at the beginning of a period, the weights for the tenants can be initialized for the period. For example, a controller can provide the weights to the access mechanism at the beginning of a period. In some examples, the access mechanism determines the revised weights for subsequent iterations of request selection during the period.

Figure 2:
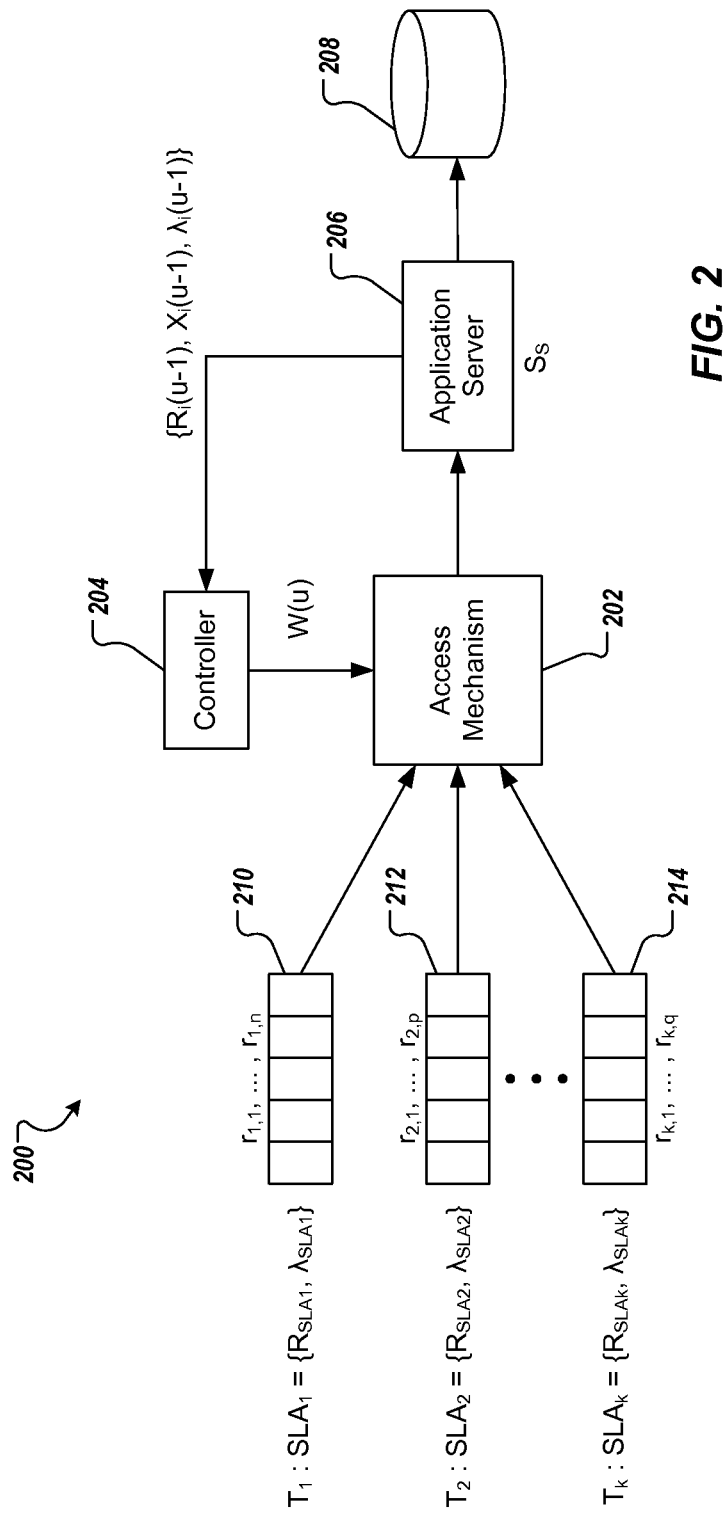
FIG. 2 depicts a block diagram of a conceptual architecture in accordance with implementations of the present disclosure.

FIG. 2 depicts a block diagram of a conceptual architecture 200 in accordance with implementations of the present disclosure. In the depicted example, the conceptual architecture 200 includes an access mechanism 202, a controller 204, an application server 206, and a database 208. In the depicted example, tenants $T_1, \ldots, T_k$ are also provided, and include respective request queues 210, 212, 214. In the example context provided above, k is equal to 3. Each queue 210, 212, 214 queues respective requests $r_1, r_2, \ldots, r_q$ that are to be processed by the application server 206.

In accordance with implementations of the present disclosure, the access mechanism 202 selects requests from the respective request queues 210, 212, 214 for processing by the application server 206. In some examples, processing of a request can include accessing the database 208. In some examples, the application server 206 provides responses based on processed requests, e.g., responses are provided back to requesting tenants. In some examples, as discussed in further detail herein, the application server 206 provides feedback to the controller 204. In some examples, the feedback includes throughput rate and average response time per tenant for processed requests. In some examples, the controller 204 provides weights for each period of request selection.

In accordance with implementations of the present disclosure, the access mechanism 202 selects next requests to be processed based on weights associated with the respective tenants $T_1, \ldots, T_k$. In some examples, the access mechanism 202 selects requests during a defined time period, e.g., 1 second. For example, multiple iterations of request selection can be performed during the defined time period. In some examples, the weights associated with the respective tenants $T_1, \ldots, T_k$ are dynamic during the time period. In some examples, the weights can be determined for each iteration m during the defined time period u. For example, a weight associated with a particular tenant can be reduced and weights associated with other tenants can be increased for request selection in a subsequent time period in response to feedback from a previous period u−1.

In some examples, initial weights for the period can be provided as initialized weights. In some examples, initialized weights can be provided based on the following example relationship:

$$W_i(u)=R/R_{SLAi}$$

An example access mechanism can include probabilistic tenant selection, such as that disclosed in commonly assigned, U.S. application Ser. No. 13/904,729, filed May 29, 2013, the disclosure of which is expressly incorporated herein by reference in the entirety. Implementations of the present disclosure are applicable with other access mechanisms, e.g., weighted round-robin (WRR) tenant selection.

By determining weights for each period the closed workload behavior of the requests coming from different tenants can be controlled, e.g., by the controller 204. For example, and based on the discussion above, the controller 204 can receive the average response time and throughput per tenant of the last period as feedback from the application server 206, can calculate new weights for the next period, and provide the weights to the access mechanism for selecting requests from tenants during the period.

In accordance with implementations of the present disclosure, a multi-stage feedback control is provided, which controls the closed workload behavior of the requests coming from different tenants. In some examples, the feedback control is executed by a control, e.g., the controller 204 of FIG. 2. In some implementations, the feedback control dynamically adjusts weights assigned to respective tenants for each period of a plurality of periods. In accordance with implementations of the present disclosure the average response time and the throughput per tenant of the last period are provided as feedback, and new weights are determined for tenants based on the feedback.

In some implementations, it is determined whether there is a response time violation for any tenant during a previous period. In some examples, a response time error (ER) can be determined for each tenant based on the following example relationship:

$$ER_i(u-1)=R_i(u-1)-R_{SLAi}$$

where u is the next period that is to be executed, for which weights are being determined, and u−1 is the previously executed period. In some examples, a response time violation occurs when ER is greater than zero for any tenant. In accordance with implementations of the present disclosure, if there are no response time violations, weights for all tenants for the next period u can be provided as initialized weights, as discussed above.

In some implementations, if there is at least one response time violation, weights are determined on a tenant-by-tenant basis. More particularly, for each tenant $T_i$, it can be determined whether a response time violation is present, e.g., $ER_i>0$. If a response time violation is not present, the weight for the tenant $T_i$ can be set equal to the weight of the previous period. For example:

$$W_i(u)=W_i(u-1)$$

If a response violation is present, it can be determined whether a throughput violation (quota violation) is present. In some examples, a throughput error (EQ) can be determined for each tenant based on the following example relationship:

$$EQ_i(u-1)=X_i(u-1)-Q_i(u-1)$$

In some examples, a quota violation occurs when EQ is greater than zero for the respective tenant. If a quota violation is not present, the weight for the tenant $T_i$ can be determined based on the modified PI control. For example, the weight for tenant $T_i$ can be determined based on the following example relationship:

$$W_i(u)=[W_i(u-1)-\alpha ER_{REL}(u-1)+\beta ER_{REL}(u-2)]*E(\lambda_{REL})$$

where $\alpha$ and $\beta$ are provided as constants. In some examples, $ER_{REL}$ can be determined based on the following example relationship:

$$ER_{REL}(u-1)=ER_i(u-1)/R_{SLAi}$$

In some examples, $E(\lambda_{REL})$ can be determined based on the following example relationship:

$$E(\lambda_{REL})=(\lambda_i-\lambda_{SLAi})/\lambda_{SLAi}$$

In some examples, $E(\lambda_{REL})$ can enhance precision of the control signal and help avoid oscillation.

If a quota violation is present, the weight for tenant $T_i$ can be determined based on the volunteer increase value ($W_v$) for all tenants. The volunteer increase value can be determined for tenant $T_i$ based on the following example relationship:

$$W_{v,i}(u)=[X_i(u-1)+(R_{ADDL}/R_i(u-1))]/X_i(u-1)$$

where $R_{ADDL}$ indicates additional time that can be provided to disruptive tenants without violating SLAs of abiding tenants. In some examples, a disruptive tenant includes a tenant that has a throughput violation. In some examples, $W_{v,i}$ can be summed for all tenants being considered to provide $W_v$. In some examples, the weight assigned to tenant $T_i$ can be determined based on the following example relationship:

$$W_i(u)=W_i(u-1)*W_v$$

Accordingly, the weight for the particular tenant can be increased, if the system is underutilized and additional weight $W_v$ could be given to the tenant sending more requests than it is allowed to send, e.g., per SLA.

In some implementations, $R_{ADDL}$ is determined based on a surplus value (Y) that can be determined based on $ER_i$ for all tenants that are accounted for in the calculation of R. In some examples, the surplus value can initially be set equal to 0, and can be subsequently calculated based on the following example relationship:

$$Y=Y-ER_i(u-1)*X_i(u-1)$$

In some examples, the surplus value can be incremented for each instance where a considered tenant has a response error that is less than 0. The following example algorithm can be provided:

for $\forall VT_i \in R$ do
   if $ER_i<0$ then
     $Y=Y-ER_i(u-1)*X_i(u-1)$
     count=count+1
   end if
   end for In some implementations, $R_{ADDL}$ can be determined based on the following example relationship:

$$R_{ADDL}=Y/(k-\text{count})$$

In some examples, the following example algorithm can be provided for determining the weight for a tenant that includes a response time violation and a quota violation:

for $\forall T_i \in R$ do
     if $ER_i > 0$ then
       $W_i(u) = W_i(u-1) * W_v$
     end if
   end for In some implementations, after the weights have been determined for each tenant for the next period, the weights are normalized. In some examples, the weights are normalized such that each weight is within a range from 0 to 1. In some examples, the weights are normalized such that the sum of the weights for all the tenants is equal to 1. In some examples, weights can be normalized based on the following example relationship:

$$W_i=W_i/[W_i+ \ldots +W_n]$$

where n is the number of tenants being considered for the current period u. In some examples, n=k. For example, the weights can be determined for all tenants of a multi-tenant system. In some examples, n<k. For example, weights can be determined for less than all tenants of the multi-tenant system. In some examples, only tenants having a non-empty queue, e.g., having pending requests, are considered for the current period.

Figure 3:
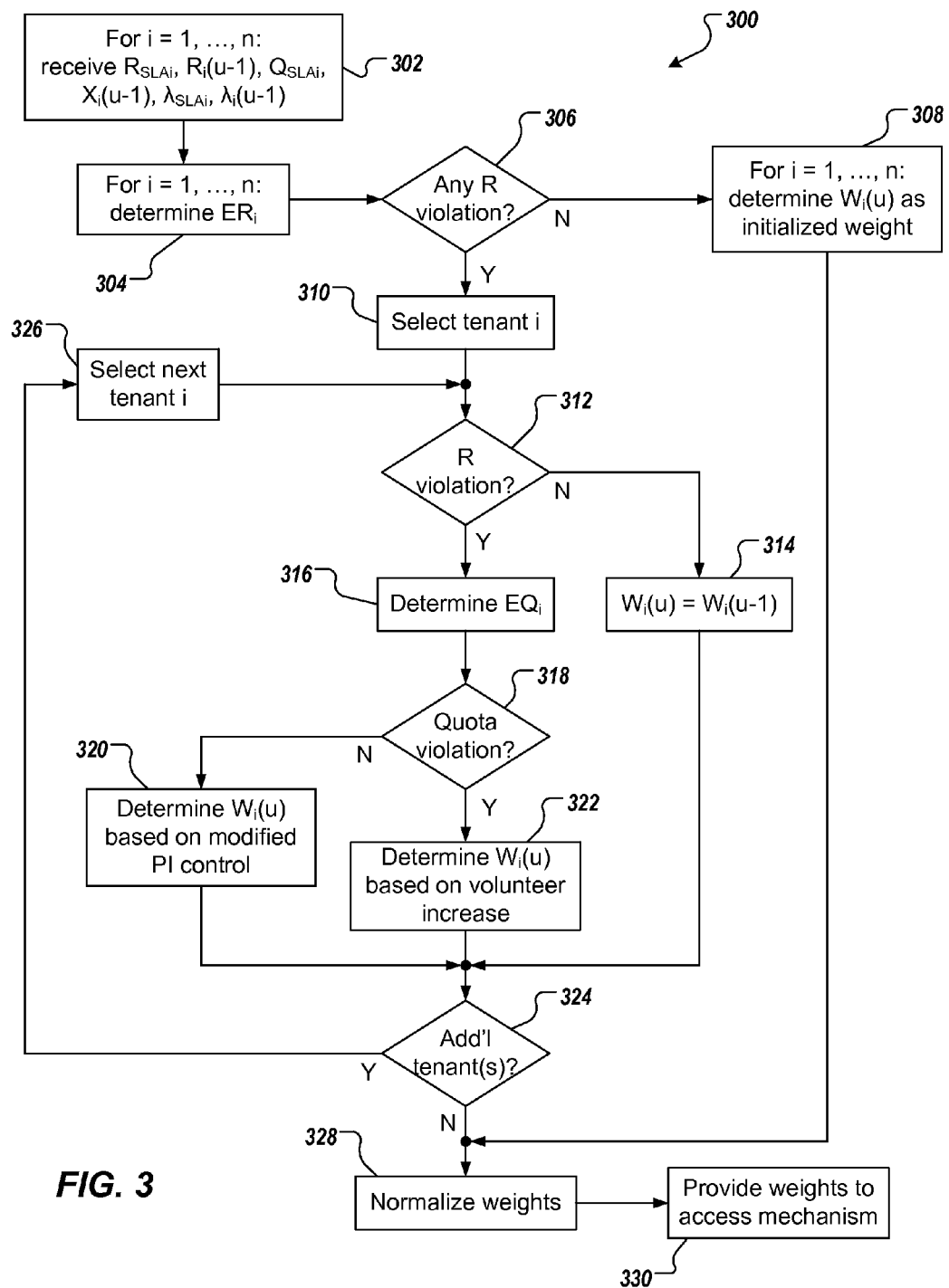
FIG. 3 depicts an example process that can be executed in accordance with implementations of the present disclosure.

FIG. 3 depicts an example process 300 that can be executed in accordance with implementations of the present disclosure. In some examples, the example process 300 can be provided as one or more computer-executable programs executed using one or more computing devices. In some examples, the example process 300 can represent actions executed at each period of a plurality of periods.

Metrics are received for tenants $T_i$, where i=1, n (302). For example, for each tenant, for which a weight is to be determined for a next period u, $R_{SLAi}$, $R_i(u-1)$, $Q_{SLAi}$, $X_i(u-1)$, $\lambda_{SLAi}$ and $\lambda_i(u-1)$ are received. In some examples, $R_i(u-1)$, $X_i(u-1)$ and $\lambda_i(u-1)$ can be provided as feedback, e.g., from an application server. Response errors are determined (304). In some examples, n=k. For example, the example process 300 can be executed for all tenants of a multi-tenant system. In some examples, n<k. For example, the example process 300 can be executed for less than all tenants of the multi-tenant system. In some examples, only tenants having a non-empty queue, e.g., having pending requests, are considered for the current period.

For example, for each tenant, for which a weight is to be determined for a next period u, $ER_i$ is determined, as discussed above. It is determined whether any response time violation is present for the tenants, for which a weight is to be determined for a next period u (306). If no response time violation is present, weights are determined as initialized weights for each tenant, for which a weight is to be determined for a next period u, as discussed above (308).

If no response time violation is present, each tenant is considered individually. In some examples, a tenant $T_i$ is selected (310). It is determined whether a response time violation is present for the tenant $T_i$ (312). If a response time violation is not present, the weight for the next period ($W_i(u)$) is set equal to the weight of the previous period ($W_i(u-1)$) (314). If a response time violation is present, a quota error for the tenant $T_i$ ($EQ_i$) is determined (316). It is determined whether a quota violation is present for the tenant $T_i$ (318). In some examples, if $EQ_i$ is greater than 0, a quota violation is present. If a quota violation is not present, the weight for the next period ($W_i(u)$) is determined based on the modified PI control (320). If a quota violation is present, the weight for the next period ($W_i(u)$) is determined based on the volunteer increase (322).

It is determined whether weights have been determined for all tenants for the current period (324). If there is at least one additional tenant, for which a weight is to be determined, a next tenant $T_i$ is selected (326), and the process 300 loops back. If there are no additional tenants, for which a weight is to be determined, the weights are normalized (328), and are provided to an access mechanism (330).

Figure 4:
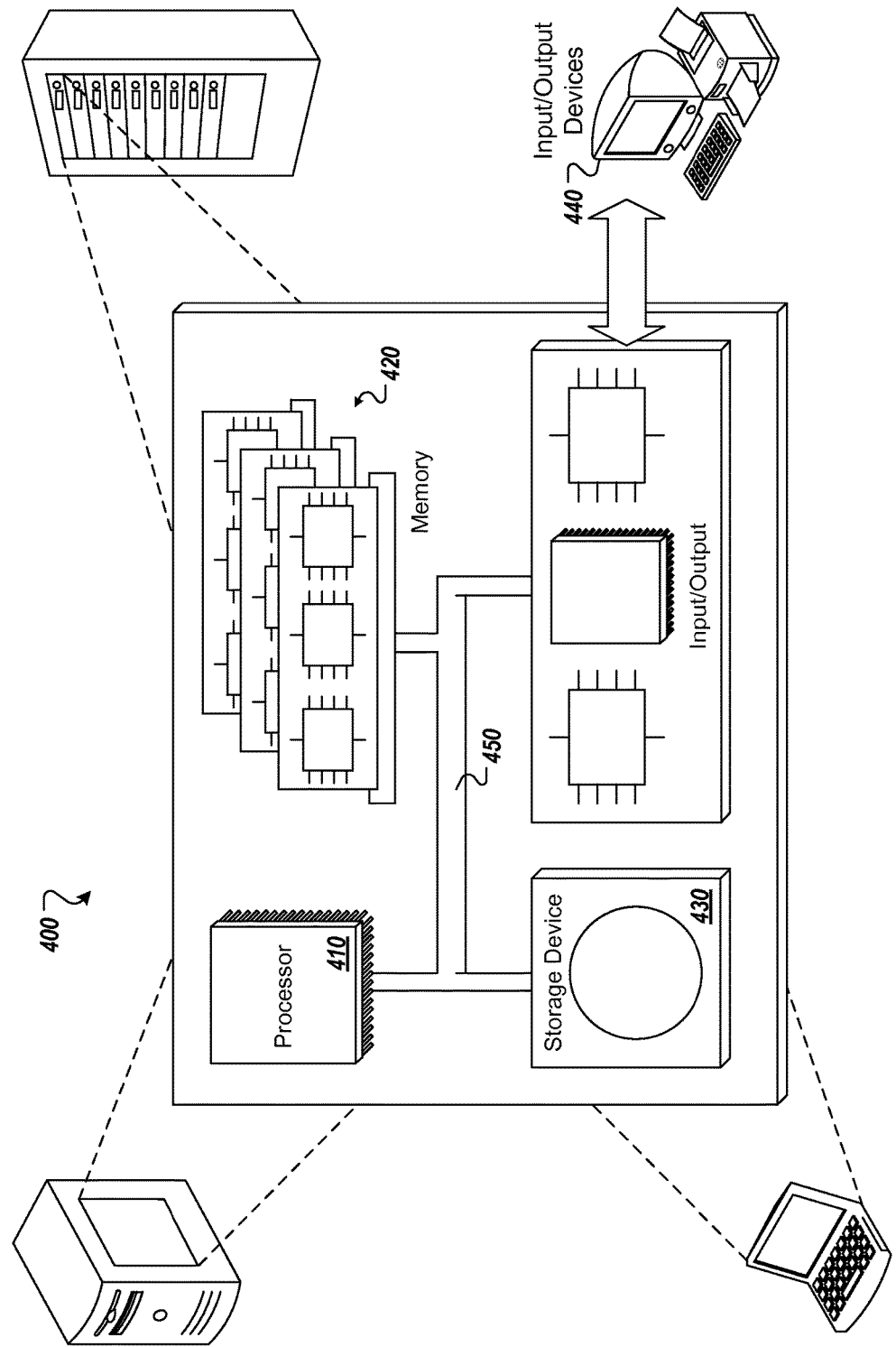
FIG. 4 is a schematic illustration of example computer systems that can be used to execute implementations of the present disclosure.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. The components 410, 420, 430, 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit. The storage device 430 is capable of providing mass storage for the system 400. In one implementation, the storage device 430 is a computer-readable medium. In various different implementations, the storage device 430 may be a floppy disk device, a hard disk device, an optical disk device, or a tape device. The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method, for determining weights for selecting requests from a plurality of tenant queues in a multi-tenant system, the method being executed using one or more processors and comprising:
   receiving, by the one or more processors, measured response time and measured throughput for each tenant in a set of tenants being considered in a current period;
   for each tenant in the set of tenants, determining a weight based on respective measured response times per current period relative to a total of average response time for all tenants in the set of tenants and respective measured throughput provided as a throughput processed for each tenant in the set of tenants per current period, the weight being determined based on:
      a previous weight, in response to absence of a response time violation, and
      in response to occurrence of a response time violation, one of a modified proportional and integral (PI) control and a volunteer weight increase, the modified PI control being based on a relative error in a throughput rate to enhance a precision of the weight, and the volunteer weight increase being associated to the multi-tenant system being underutilized;
   providing, by the one or more processors, a set of weights, the set of weights comprising the weight determined for each tenant in the set of tenants;
   selecting, by an access mechanism, at least one tenant request based on the set of weights; and
   transmitting, by the access mechanism, the at least one tenant request to an application server for processing of the at least one tenant request.

2. The method of claim 1, wherein for each tenant in the set of tenants, determining a weight based on respective measured response times and respective measured throughput comprises determining that a response time violation is not present for any tenant in the set of tenants and, in response, determining the weight for each tenant as an initialized weight.

3. The method of claim 2, wherein determining that a response time violation is not present is based on respective response time errors, each response time error being determined based on the measured response time and an agreed average response time for a respective tenant.

4. The method of claim 1, wherein for each tenant in the set of tenants, determining a weight based on respective measured response times and respective measured throughput comprises determining that a response time violation is not present for a particular tenant in the set of tenants and, in response, determining setting the weight for the particular tenant equal to a weight of a previous period.

5. The method of claim 1, wherein for each tenant in the set of tenants, determining a weight based on respective measured response times and respective measured throughput comprises determining whether a quota violation is present for a particular tenant in the set of tenants.

6. The method of claim 5, further comprising determining that the quota violation is present for the particular tenant and, in response, determining the weight for the particular tenant based on the volunteer weight increase.

7. The method of claim 5, further comprising determining that the quota violation is not present for the particular tenant and, in response, determining the weight for the particular tenant based on the modified PI control.

8. The method of claim 5, wherein determining whether the quota violation is present for the particular tenant in the set of tenants is performed in response to determining that a response time violation is present for the particular tenant.

9. The method of claim 5, wherein determining whether the quota violation is present for a particular tenant in the set of tenants is based on a respective quota error, the respective quota error being determined based on the measured throughput and an agreed throughput for the particular tenant.

10. The method of claim 1, wherein the measured response time and measured throughput are provided for a previous period.

11. The method of claim 1, wherein tenants in the set of tenants include tenants having non-empty request queues.

12. The method of claim 1, further comprising normalizing weights in the set of weights, such that a sum of the weights in the plurality of weights is equal to 1.

13. The method of claim 1, wherein the volunteer weight increase is determined based on a measured response time and a measured throughput for a respective tenant, and additional time that can be given to disruptive tenants without violating agreements of abiding tenants.

14. The method of claim 1, wherein, for the current period, a first weight of a first tenant is provided as a previous weight of the first tenant, a second weight of a second tenant is provided as the initialized weight, and a third weight of a third tenant is provided based on a weight determined using the modified PI control.

15. A non-transitory computer-readable storage medium coupled to one or more processors and having instructions stored thereon which, when executed by the one or more processors, cause the one or more processors to perform operations for determining weights for selecting requests from a plurality of tenant queues in a multi-tenant system, the operations comprising:

receiving measured response time and measured throughput for each tenant in a set of tenants being considered in a current period;

for each tenant in the set of tenants, determining a weight based on respective measured response times per current period relative to a total of average response time for all tenants in the set of tenants and respective measured throughput provided as a throughput processed for each tenant in the set of tenants per current period, the weight being determined based on:

a previous weight, in response to absence of a response time violation, and in response to occurrence of a response time violation, one of a modified proportional and integral (PI) control and a volunteer weight increase, the modified PI control being based on a relative error in a throughput rate to enhance a precision of the weight, and the volunteer weight increase being associated to the multi-tenant system being underutilized;

providing a set of weights, the set of weights comprising the weight determined for each tenant in the set of tenants;

selecting, by an access mechanism, at least one tenant request based on the set of weights; and transmitting, by the access mechanism, the at least one tenant request to an application server for processing of the at least one tenant request.

16. A system, comprising:

a computing device; and a non-transitory computer-readable storage device coupled to the computing device and having instructions stored thereon which, when executed by the computing device, cause the computing device to perform operations for determining weights for selecting requests from a plurality of tenant queues in a multi-tenant system, the operations comprising:

receiving measured response time and measured throughput for each tenant in a set of tenants being considered in a current period;

for each tenant in the set of tenants, determining a weight based on respective measured response times per current period relative to a total of average response time for all tenants in the set of tenants and respective measured throughput provided as a throughput processed for each tenant in the set of tenants per current period, the weight being determined based on:

a previous weight, in response to absence of a response time violation, and in response to occurrence of a response time violation, one of a modified proportional and integral (PI) control and a volunteer weight increase, the modified PI control being based on a relative error in a throughput rate to enhance a precision of the weight, and the volunteer weight increase being associated to the multi-tenant system being underutilized;

providing a set of weights, the set of weights comprising the weight determined for each tenant in the set of tenants;

selecting, by an access mechanism, at least one tenant request based on the set of weights; and transmitting, by the access mechanism, the at least one tenant request to an application server for processing of the at least one tenant request.

* * * * *